June 30, 1931.  H. O. RASTETTER  1,812,117
CLAMP COLLAR
Filed Feb. 24, 1928  3 Sheets-Sheet 1

Inventor
*Harry O. Rastetter*
By *Freast and Boud*
Attorneys

Inventor
Harry O. Rastetter

Patented June 30, 1931

1,812,117

UNITED STATES PATENT OFFICE

HARRY O. RASTETTER, OF CANTON, OHIO, ASSIGNOR TO THE UNION METAL MANUFACTURING COMPANY, OF CANTON, OHIO, A CORPORATION OF OHIO

CLAMP COLLAR

Application filed February 24, 1928. Serial No. 256,573.

The invention relates to fluted poles such as transmission poles, lighting standards, sign posts, and the like, and more particularly to a clamp member for attaching horizontal arms to such poles.

The object of the improvement is to provide a clamp member which may be in the form of a separable clamp collar adapted to be tightly clamped upon fluted poles of different diameters and provided with means for the connection of one or more horizontal arms for supporting transmission wires, lighting fixtures, signs and the like.

The above and ancillary objects may be attained by providing a separable ring with means for clamping the parts together around a fluted pole, one or more members of the separable ring having upon its inner side a plurality of angular faces, each of which is arranged to engage the fillet of one flute of the corresponding portion of the pole.

These angular faces may be located in angular planes converging at a common point, preferably the fillet of one of the flutes, each plane intersecting a different fillet of the pole.

With the separable clamp collar thus provided with a plurality of angular faces for contact with the fillets of the several flutes of a pole of given diameter, the collar may be fitted to poles of different diameters, or to tapered poles at different points along the length of such poles, within a limited range, it being understood that each collar is adapted to fit only poles having a given number of flutes.

Figure 3:
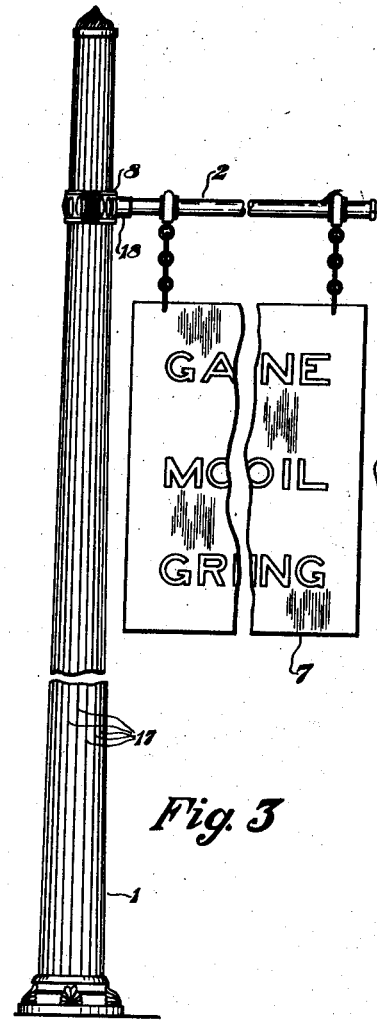
Figure 1:
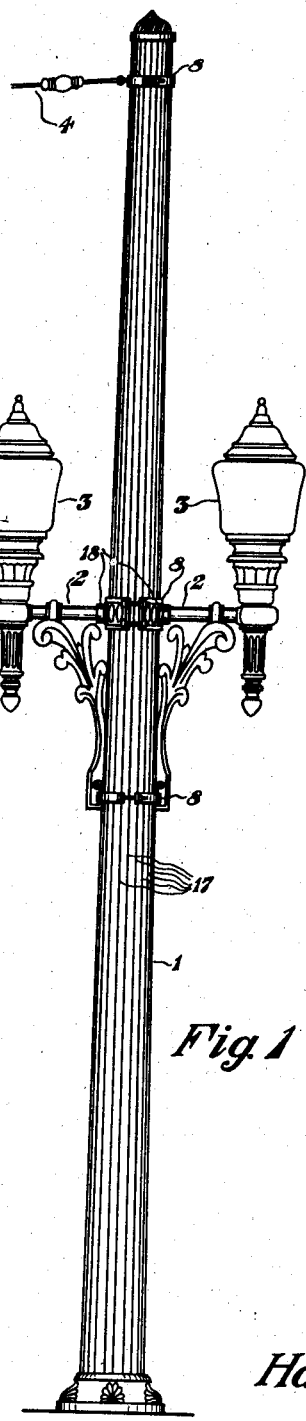
Figure 2:
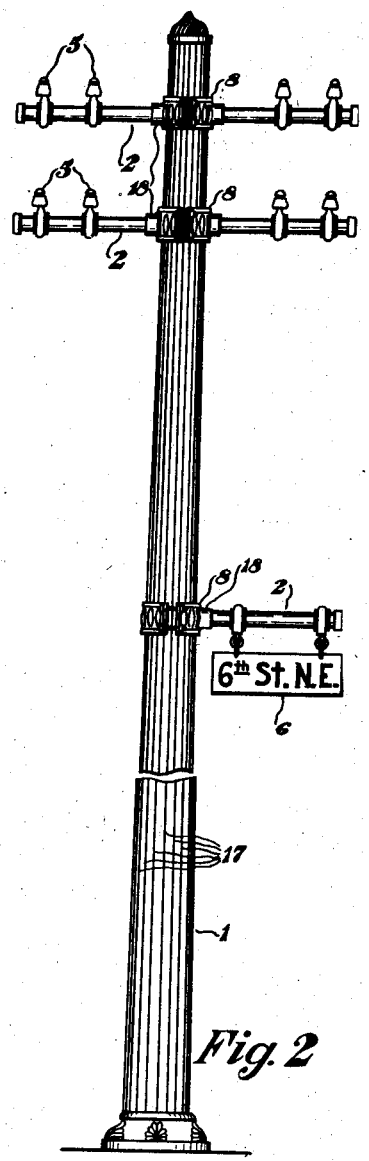
Figure 8:
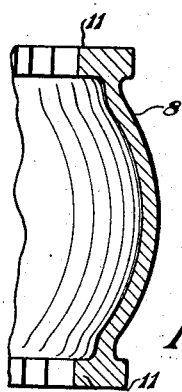
Figure 4:
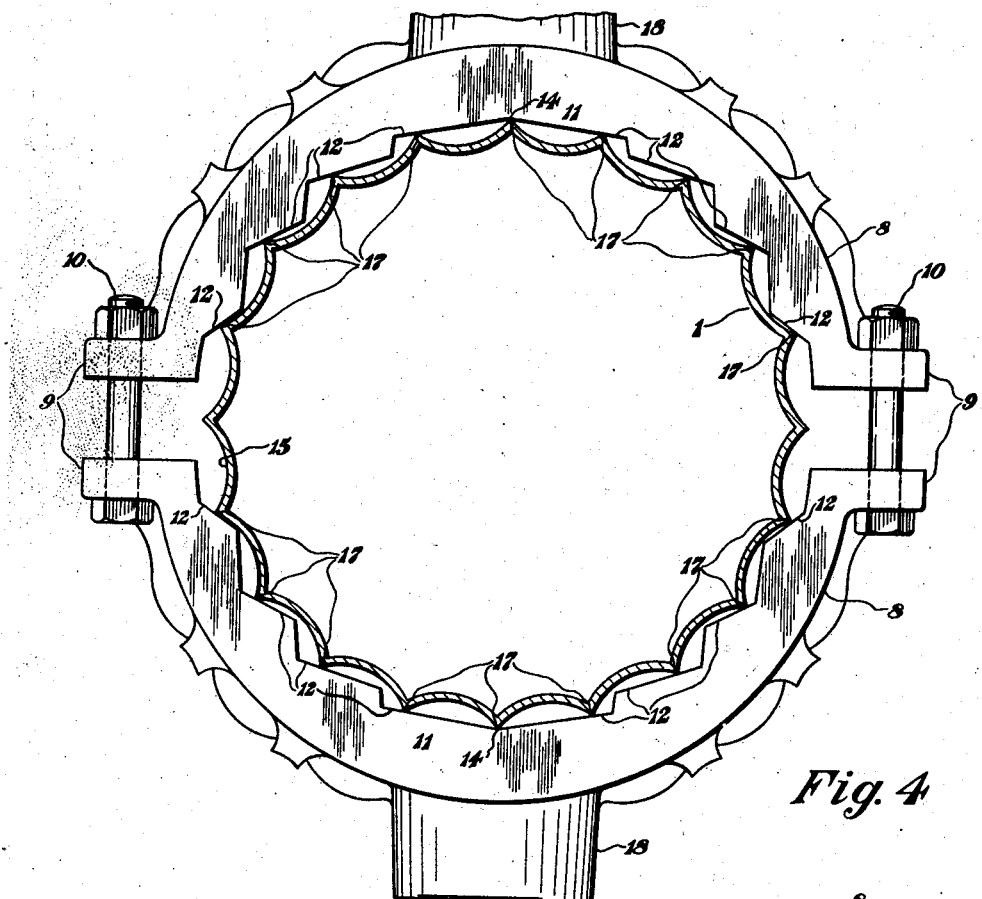
Figure 5:
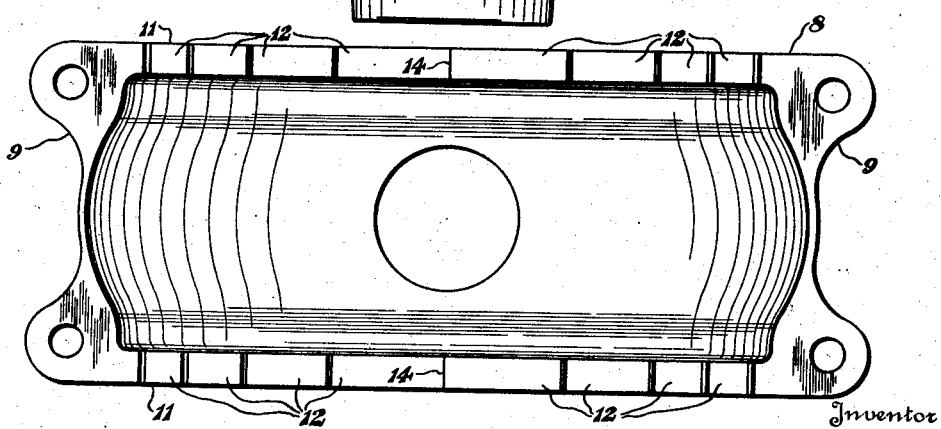
Figure 6:
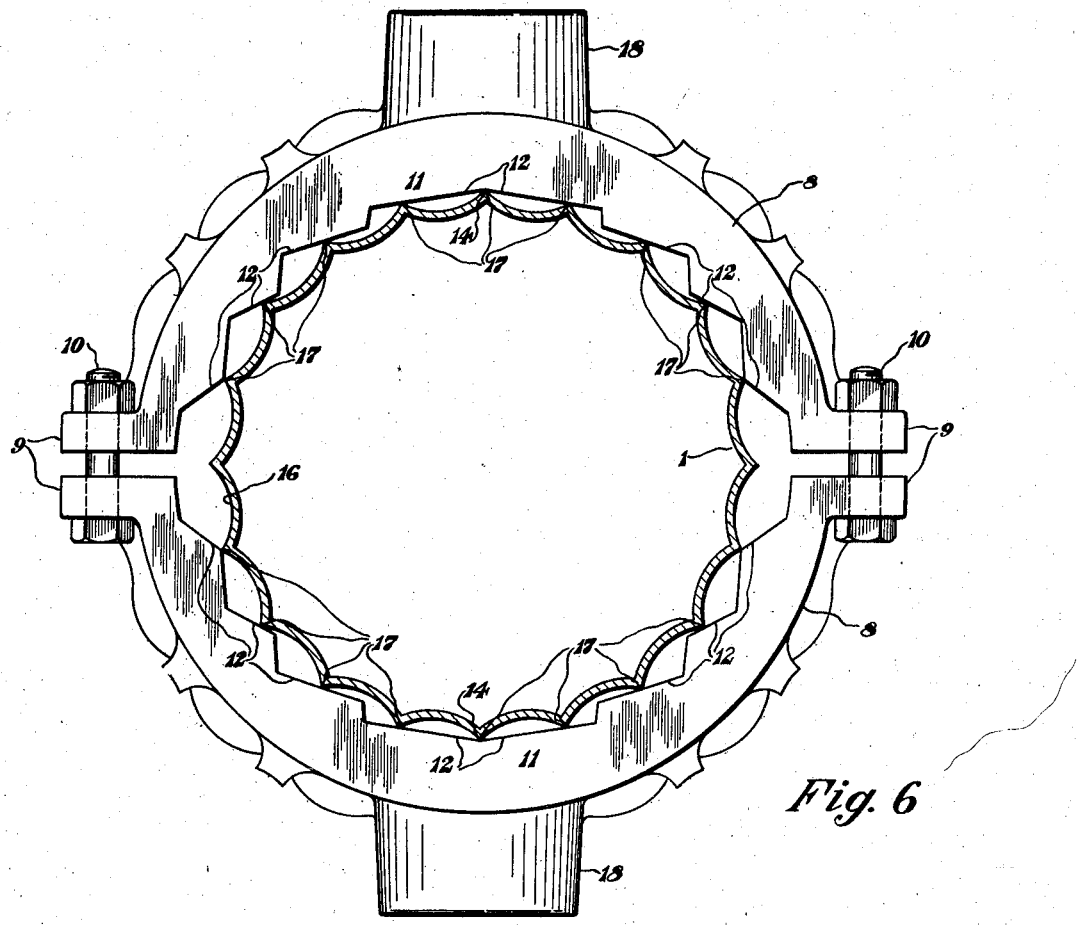
Figure 7:
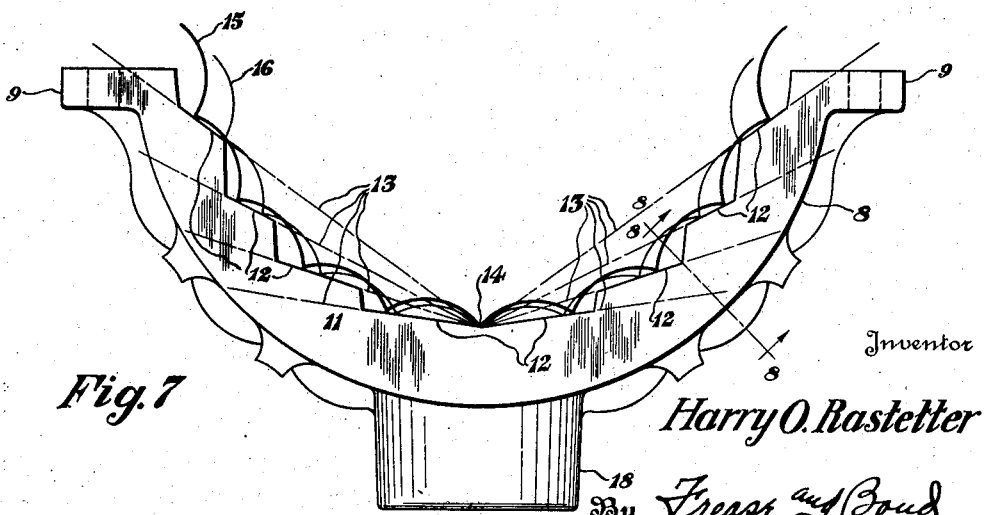

An embodiment of the invention is illustrated in the accompanying drawings, in which Figure 1 is an elevation of a lighting standard, showing the use of the improved clamp collar for attaching the lighting fixtures thereto;

Fig. 2, a similar view of a transmission pole, showing the cross arms, and also a street sign, attached thereto by the improved clamp collars;

Fig. 3, an elevation of a sign post in which a sign is suspended from an arm attached to the post by one of the clamp collars;

Fig. 4, a transverse section through a fluted pole, showing the clamp collar, to which the invention pertains, engirdling the pole;

Fig. 5, an elevation of the interior of one member of the separable collar;

Fig. 6, a view similar to Fig. 4, showing the collar engirdling a pole of smaller diameter;

Fig. 7, a plan view of one member of the separable collar, showing diagrammatically the converging, angular planes in which the several faces are located and the adaptability of the collar to poles of various diameters; and Fig. 8, a section on the line 8—8, Fig. 7.

Similar numerals refer to similar parts throughout the drawings.

The improved clamp is designed for use upon fluted poles or columns of any description, and is especially adapted for use upon tapered, fluted poles having fillets between flutes such as indicated at 1 in the drawings.

Such tapered, fluted poles may be used as lighting standards, transmission poles, sign posts, and the like, as shown in Figs. 1 to 3. The clamp collar is adapted for attaching horizontal arms to the poles, as shown generally at 2.

These arms may support lighting fixtures, as shown at 3, or trolley supports as shown at 4, in Fig. 1; transmission wire insulators 5 or street signs 6, as shown in Fig. 2; advertising signs 7, as shown in Fig. 3; or other devices which may be attached to, or supported from, a pole of this character.

The clamp may be in the form of a collar comprising two similar substantially semicircular separable clamp members or sections indicated generally at 8. Each of these clamp sections may be provided at its ends with outturned flanges 9 for the reception of bolts or the like, as at 10, to draw the sections together to engirdle a fluted pole.

Each collar section is provided upon its inner side with the flanges 11, the upper flange being slightly wider than the lower in order to conform to the taper of the fluted pole. Each of these flanges is provided with a plurality of four or more plane faces 12, for contact at all positions of adjustment with the fillets on the adjacent side of the pole.

As best shown in Fig. 7, these plane faces are located in a plurality of planes in angular relation with each other indicated by the broken lines 13 converging to intersect each other at a line common to all of the planes, the common line being located in one of the faces as indicated at 14, which may be centrally located with reference to the collar section and at the intersection of two of the faces.

In Fig. 7, the outlines of two fluted poles of different diameters are indicated at 15 and 16, the larger diameter being shown at 15.

With the clamp collar constructed to fit one of these diameters of pole, it will be seen that considerable variation in the size of pole is permitted.

In Figs. 4 and 6, the collar is shown clamped to the large diameter of fluted pole 15 and the smaller diameter of pole 16 to either of which it is equally adapted.

As shown in these figures, the fillets 17 of the fluted pole engage the plane faces 12 of the collar with the exception of the fillets adjacent to the flanges 9.

By drawing the collar sections together around the pole, as by means of the bolts 10, it will be seen that the collar is tightly clamped upon the pole, contacting only with the fillets thereof.

The clamp collar so constructed may be adjusted longitudinally upon the pole and quickly clamped in the desired position, the various positions shown in Figs. 1 to 3 inclusive being easily attained with a single size of collar.

Bosses 18 may be provided upon the collar sections for the attachment of the horizontal arms 2 by means of which the various devices shown in Figs. 1 to 3 may be supported upon the poles.

It will be noted, by referring to Figs. 4, 6 and 7 of the drawings, that the faces 12 extending from the line of intersection 14 of the planes 13 in which all of the faces are located, are angular with relation to each other; it will be further noted that the remaining faces 12 excepting only those two which extend from the common line 14, are not only in angular relation with each other but also are offset from each other.

Referring to Fig. 6 of the drawings, it will be seen that the lower clamp collar 8 and the nuts and bolts 10 form means partially engirdling the pole for clamping the upper clamp member 8 against the pole; and it is also seen that the lower clamp member 8 contacts with the side of the pole opposite from the upper clamp member 8 for clamping the upper clamp member against the pole.

I claim:

1. In combination, a tapered, fluted pole having fillets between flutes, and an adjustable clamp collar for the pole, the collar including separable sections arranged to engirdle the pole, each section having plane faces in angular relation with each other, the faces contacting with the fillets only of the pole in all positions of adjustment, and adjustable means connecting the sections together to clamp the sections against the pole at different points along the length of the pole.

2. In combination, a tapered, fluted pole having fillets between flutes, and an adjustable clamp collar for the pole, the collar including separable sections arranged to engirdle the pole, spaced internal flanges upon each section, each flange having plane faces in angular relation with each other, each face contacting with one fillet only of the pole in all positions of adjustment, and adjustable means connecting the sections together to clamp the sections against the pole at different points along the length of the pole.

3. A clamp collar for a fluted pole including separable sections arranged to engirdle the pole, each section having four or more faces for contacting with the pole, and all of said faces being located in planes converging to intersect each other at a line common to all of the planes.

4. A clamp member for a fluted pole, having four or more faces for contacting with the pole, and all of said faces being located in planes converging to intersect each other at a line common to all of the planes.

5. A clamp member for a fluted pole, having spaced flanges, each flange having four or more faces for contacting with the pole, and all of said faces being located in planes converging to intersect each other at a line common to all of the planes.

6. A clamp member for a fluted pole, said member having a plurality of faces, two adjacent faces being located in planes intersecting each other at a line, and the other of said faces being offset with respect to said adjacent faces and with respect to each other and located in planes intersecting each other at said line.

In testimony that I claim the above, I have hereunto subscribed my name.

HARRY O. RASTETTER.